(12) United States Patent
Schuette et al.

(10) Patent No.: US 7,501,996 B2
(45) Date of Patent: Mar. 10, 2009

(54) IMMERSIVE INPUT DISPLAY APPARATUS

(75) Inventors: Lawrence Schuette, McLean, VA (US); James Durbin, Annadale, VA (US); David Tremper, Springfield, VA (US); Kevin Burnett, Springfield, VA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 676 days.

(21) Appl. No.: 10/863,847

(22) Filed: Jun. 3, 2004

(65) Prior Publication Data

US 2005/0270251 A1 Dec. 8, 2005

(51) Int. Cl.
    *G09G 5/00* (2006.01)
(52) U.S. Cl. .................. 345/8; 345/7; 359/13
(58) Field of Classification Search .............. 345/7–9, 345/80; 359/630, 631, 13
    See application file for complete search history.

(56) References Cited

U.S. PATENT DOCUMENTS

| 5,153,569 | A | | 10/1992 | Kawamura et al. | |
|---|---|---|---|---|---|
| 5,189,512 | A | | 2/1993 | Cameron et al. | |
| 5,572,343 | A | * | 11/1996 | Okamura et al. | 345/8 |
| 5,621,424 | A | * | 4/1997 | Shimada et al. | 345/8 |
| 5,642,221 | A | | 6/1997 | Fischer et al. | |
| 5,912,650 | A | * | 6/1999 | Carollo | 345/7 |
| 6,618,099 | B1 | | 9/2003 | Spitzer | |
| 7,056,119 | B2 | * | 6/2006 | Cabato et al. | 434/38 |
| 7,199,767 | B2 | * | 4/2007 | Spero | 345/7 |
| 2002/0122015 | A1 | * | 9/2002 | Song et al. | 345/8 |
| 2005/0092923 | A1 | * | 5/2005 | Fantone et al. | 250/330 |

FOREIGN PATENT DOCUMENTS

WO    WO 95/24713    9/1995

* cited by examiner

*Primary Examiner*—Richard Hjerpe
*Assistant Examiner*—Kimnhung Nguyen
(74) *Attorney, Agent, or Firm*—John J. Karasek; Suresh Koshy (57) ABSTRACT

An apparatus includes a deformable eyecup. A display shares an optical path with the eyecup. A monocular houses the display. A shutter shares the optical path with the eyecup and the display, wherein the shutter opens upon deformation of the eyecup. Optionally, the eyecup includes a rubber, neoprene, plastic, and/or pleated material. Optionally, the shutter is integral with the eyecup. Optionally, the shutter includes a mechanical iris, a liquid crystal shutter, a micro-mechanical micro-shutter array, and/or a shutter including a plurality of flaps that flex upon the deformation of the eyecup.

8 Claims, 7 Drawing Sheets

IMMERSIVE INPUT DISPLAY APPARATUS

TECHNICAL FIELD

The present invention relates generally to an apparatus for providing an immersive input display, and more particularly to an apparatus for providing an immersive input display in a monocular encasing.

BACKGROUND ART

Results of tests with Marines at Camp Pendleton, Calif. indicate that a hand-held display viewed at a distance of one to three feet does not perform sufficiently well enough for many field operations. In direct sunlight, this display becomes very difficult to read due to glare and light saturation. The glare inhibits adequate read-ability of current display technologies. At night, a hand-held display reduces night vision and betrays tactical positions. Tactical positioning is jeopardized by light emission from the hand-held display, a circumstance often remedied in the field by reading the display under a cloth covering. Plainly, such a solution eliminates situational awareness of the surrounding environment.

It is believed that commercially available devices fail to adequately address the needs of the Marines or other users in this and other applications in this regard. For example, PCT Application No. WO 95/24713 to Fischer et al., incorporated herein by reference, discloses head-mounted display systems for the viewing of video or other sources of imagery which comprises a mechanism allowing a wide range of adjustments for presenting a display to the wearer. The various head-mounted display systems described can include rubber eye-cups integrated into their video module so as to keep all stray ambient light out of the system. The Fischer et al. system prevents situational awareness during operation thereof. Use of the Fischer et al. system invites temporary blindness, at night, for example, upon removal of the system to regain situational awareness. Such temporary blindness inhibits immediate situational awareness.

DISCLOSURE OF THE INVENTION

According to an embodiment of the invention, an apparatus includes a deformable eyecup. A display shares an optical path with the eyecup. A monocular houses the display. A shutter shares the optical path with the eyecup and the display, wherein the shutter opens upon deformation of the eyecup. Optionally, the eyecup includes a rubber, neoprene, plastic, and/or pleated material. Optionally, the shutter is integral with the eyecup. Optionally, the shutter includes a mechanical iris, a liquid crystal shutter, a micro-mechanical micro-shutter array, and/or a shutter including a plurality of flaps that flex upon the deformation of the eyecup.

Optionally, the apparatus includes a pressure sensor communicating with eyecup and the shutter such that the deformation electrically actuates the iris.

Optionally, the display comprises a micro-display. For example, the micro-display includes an organic light emitting display, a liquid crystal on silicon display, a transmissive display (e.g., a transmissive liquid crystal display), a transreflective display (e.g., a cholesteric liquid crystal display), a reflective display, a plasma display, a digital light processing display, and/or a scanned-beam display.

Optionally, the apparatus further includes a lens sharing the optical path with the shutter and the display. For example, the monocular houses the lens. Optionally, the apparatus further includes a focus slide and a focus ring for adjusting a distance between the lens and the display.

Optionally, the apparatus further includes a wireless receiver for receiving display data and sending the display data to the display. Alternatively, the apparatus further includes a wired connection or a wireless transceiver for receiving display data and sending the display data to the display, and a pointer controller, a scroll wheel, a touch pad, a mouse button, and/or a keypad for controlling the display data.

In an alternative embodiment of the invention, an apparatus includes a deformable eyecup and a micro-display sharing an optical path with the eyecup. The micro-display communicates with the eyecup such that deformation of the eyecup turns the micro-display on and restoration of the eyecup turns the micro-display off. The apparatus also includes a monocular housing the micro-display. Optionally, the eyecup includes a rubber, neoprene, plastic, and/or pleated material. Optionally, the micro-display includes an organic light emitting display, a liquid crystal on silicon display, a transmissive display (e.g., a transmissive liquid crystal display), a transreflective display (e.g., a cholesteric liquid crystal display), a reflective display, a plasma display, a digital light processing display, and/or a scanned-beam display.

Optionally, in the alternative embodiment, the apparatus further includes a lens sharing the optical path with the eyecup and the micro-display. For example, the monocular houses the lens. Optionally, the apparatus further includes a focus slide and/or a focus ring for adjusting a distance between the lens and the micro-display.

Optionally, in the alternative embodiment, the apparatus further includes a wireless receiver for receiving display data and sending the display data to the micro-display. Alternatively, the apparatus further includes a wired connection or a wireless transceiver for receiving display data and sending the display data to the micro-display, and a pointer controller, a scroll wheel, a touch pad, a mouse button, and/or a keypad for controlling the display data.

An embodiment of the invention permits maintenance of situational awareness during operation of the embodiment. In another embodiment of the invention, situational night vision is not impaired upon ceasing operation of the embodiment. In an additional embodiment of the invention, light emanating from the display is inhibited from escaping the embodiment during operation. In another embodiment of the invention, ambient light is inhibited from striking the display and preventing the discernment of display data.

In an embodiment of the instant monocular heads-up display, data is capable of being read in a truly 'heads-up' fashion. Viewing the display occupies only one eye, while concurrent attention to the surrounding environment can easily be paid.

Commercially, the monocular device has many applications. As a computer add-on, the current monocular can be connected to a system with a video graphics array, National Television System Committee, or equivalent output, for example. Other applications include fire and rescue as well as police activities, where environmental awareness as well as access to computer data are useful. Monoculars, according to the instant invention, are also easily used to display the situational awareness software used by many emergency agen-

BEST MODES OF CARRYING OUT THE INVENTION

Figure 1:
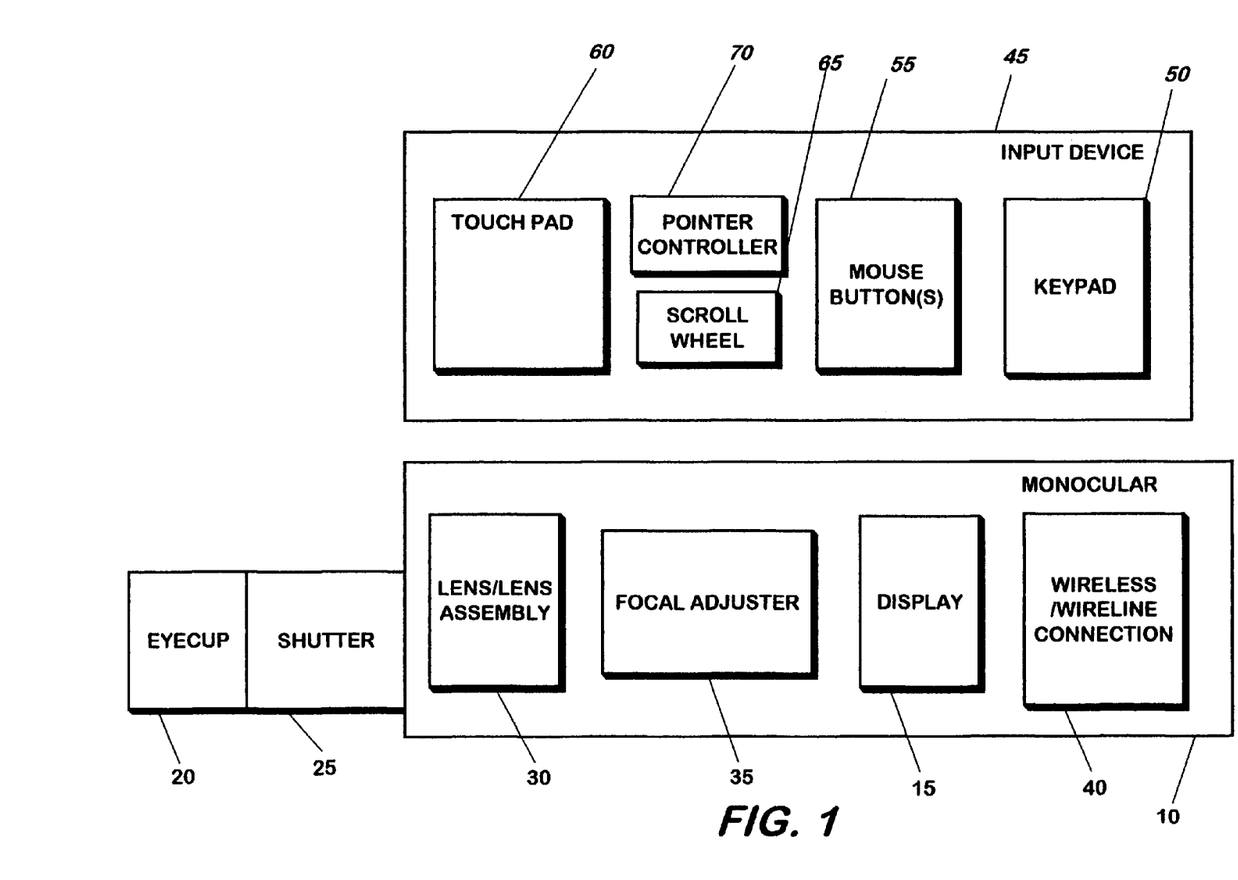
FIG. 1 is a block diagram of an embodiment of the invention.
Figure 2:
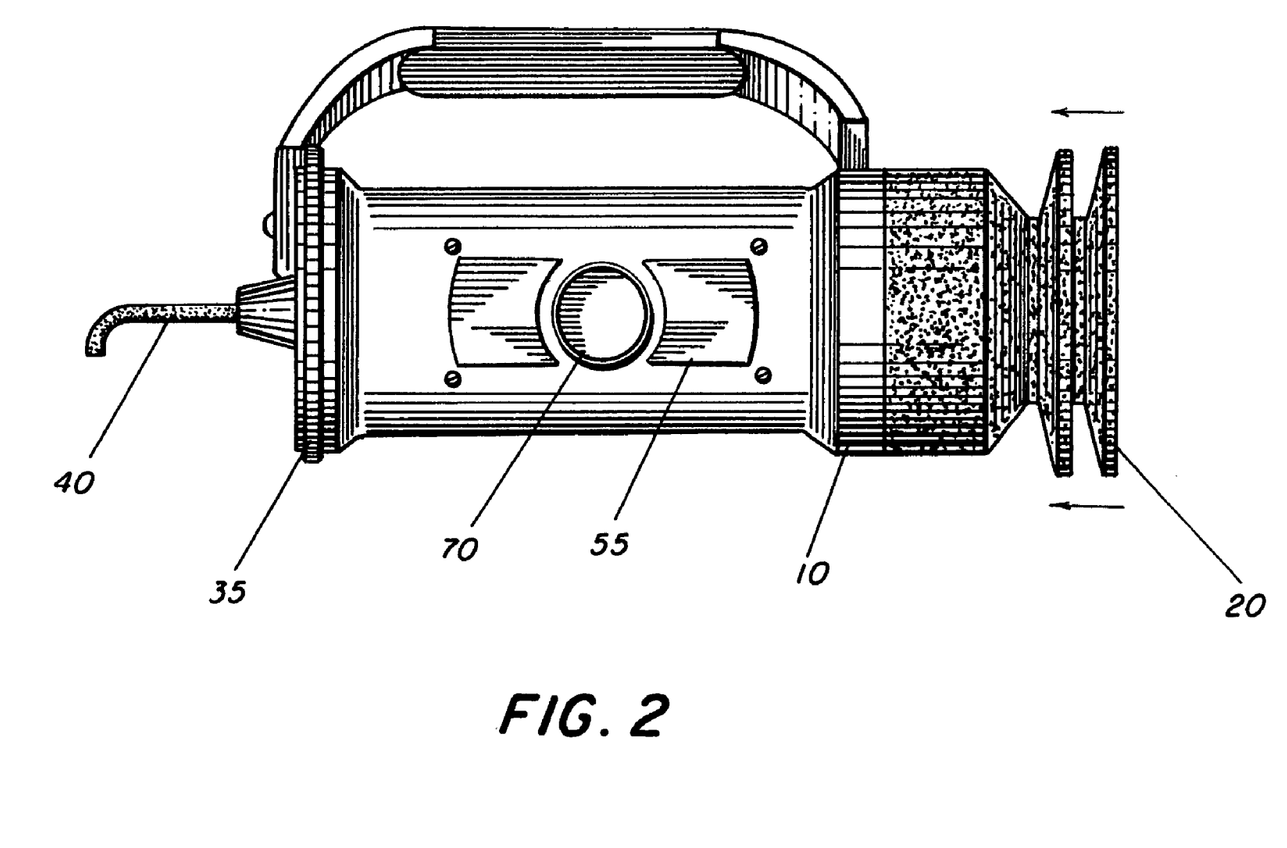
FIG. 2 is a perspective view of an embodiment of the invention, showing movement of the eyecup from a restored position to a deformed position.
Figure 3:
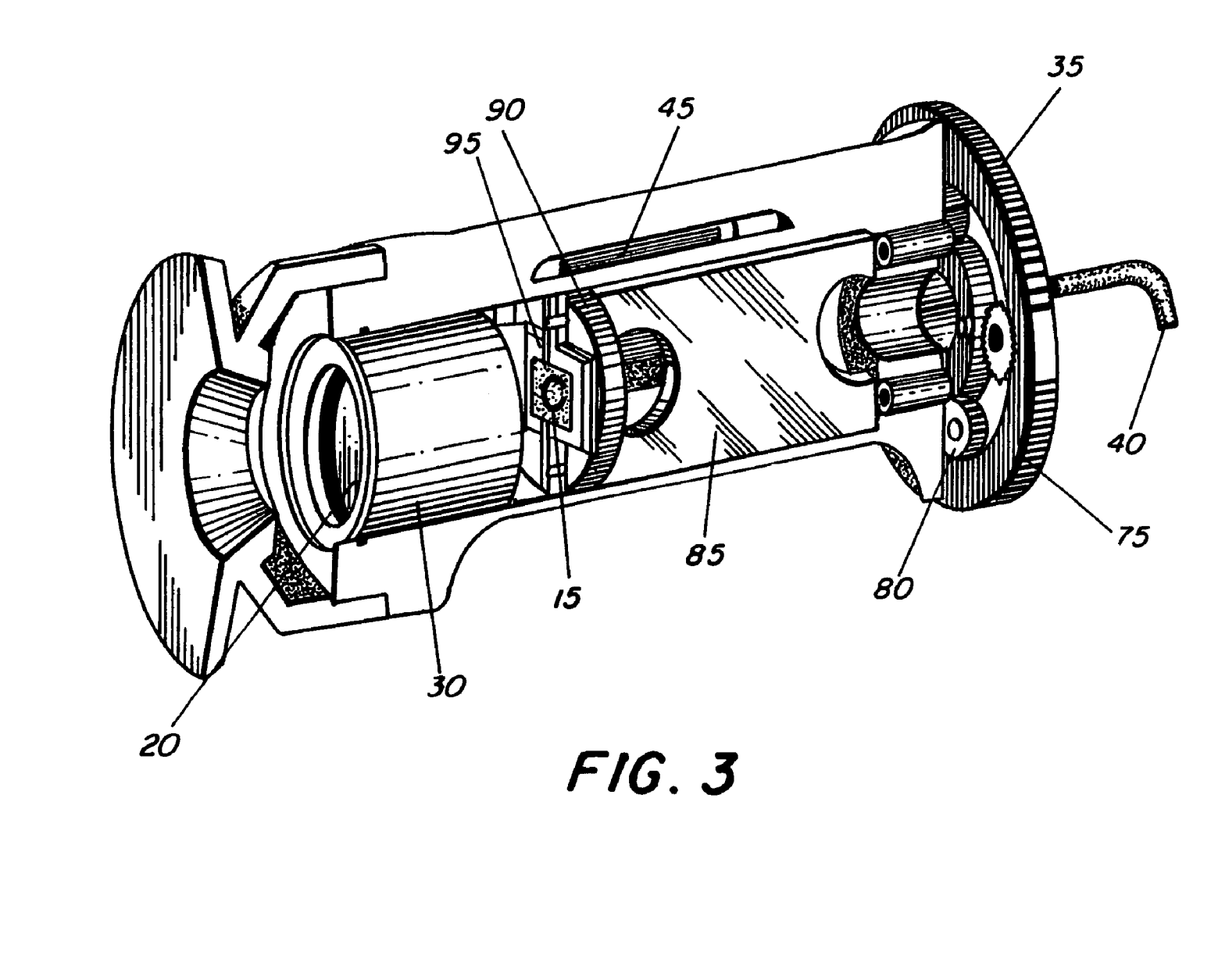
FIG. 3 is a partially cutaway, perspective view of an embodiment of the invention.

The invention, shown, by way of example, in FIGS. 1-3, is described as follows. A monocular 10 encloses a display 15. The monocular 10 allows the user full vision in one eye at all times. The monocular 10, for example, includes a cylindrical housing or other ergonomical housing. The display 15, optionally, includes a micro-display. A suitable micro-display includes, for example, an organic light emitting display, a liquid crystal on silicon display, a transmissive display (e.g., a transmissive liquid crystal display), a transreflective display (e.g., a cholesteric liquid crystal display), a reflective display, a plasma display, a digital light processing display, and a scanned-beam display. An example of a suitable organic light emitting display includes a 0.5"×0.5" super video graphics array, organic light emitting display having an 800×600 pixel resolution. Larger or smaller displays having higher or lower resolutions are suitable, depending on the application as determined by one of ordinary skill in the art. An example of a suitable scanned-beam display is the scanned-beam display in Microvision, Inc.'s Nomad Expert Technician System.

Optionally, an eyecup 20 and a shutter 25 connect to the monocular 10. The eyecup 20 and the shutter 25 are either integral or separate, but cooperatively positioned. The eyecup 20, the shutter 25, and the display 15 share an optical path. The eyecup 20 is at least axially deformable. The eyecup 20 is optionally fabricated from a resilient material, such as rubber, neoprene, plastic, and/or a pleated material. An example of a suitable eyecup 20 is CMI Rubber Co.'s "NG-Laser" rubber eye guard. As shown in FIGS. 4a, 4b, 5a, and 5b, the shutter 25, for example, includes a plurality of adjacent, wedge-shaped flaps that flex at their bases upon deformation of the eyecup 20 to open the optical path. Upon restoration of the eyecup 20, the flaps relax to close the optical path. Alternatively, the shutter 25 includes, for example, a mechanical iris, a liquid crystal shutter, and/or a micro-mechanical micro-shutter array.

To simulate the view of a standard video screen, such as a desktop monitor, the invention optionally includes a lens or lens assembly 30 sharing the optical path with the eyecup 20 and the display 15. The lens 30 and the display 15 are optionally stationary relative to each other. Alternatively, either the lens 30 or the display 15 is movable relative to the other by a focus adjuster 35. The focus adjuster 35, optionally, includes a focus ring or focus wheel, as shown in FIG. 3. For example, focus adjuster 35 cooperates with a ring gear 75. The ring gear 75 cooperates with planetary gears 80, which control axial movement of focus arm 85. The focus arm 85 is connected to display retainer 90 and/or display carrier 95, which holds the display 15. Alternatively, display retainer 90 and display carrier 95 are unitary. Turning the focus adjuster 35 adjusts the position of the display 15 with respect to the lens assembly 30. In another embodiment of the invention, a focus adjuster 35 positioned in front of the lens assembly 30 moves the lens assembly 30 with respect to the mounted display 15. Alternatively, the focus adjuster includes a focus slide connected to either the lens assembly 30 or the display 15. Movement of the focus slide adjusts the relative distance between the lens assembly 30 and the display 15.

The display 15 is optionally connected to a wired connection 40, such as a cable, to a computer (not shown). Alternatively, the display 15 is connected to a wired connection to a transceiver 40, which communicates with a remote computer, to a wireless transceiver 40, which communicates with a remote computer, or to a wireless receiver, which receives display data for the display 15.

To facilitate input from the user, an optional input device 45 mounted on the monocular 10 allows the user to input data to the computer. The input device 45 includes a keypad 50, one or more mouse buttons 55, a touch pad 60, a scroll wheel 65, a pointer controller 70, and/or equivalent input apparatuses. Examples of the pointer controller include a trackball, a mouse, and a stick pointer, and equivalents thereof. For example, the input device is a 3-button mouse and connects to the host computer, for example, via a serial data port, such as RS232 connection, or via a universal serial bus port. The input device allows the user mouse control of the host computer. In an alternate embodiment of the invention, keyboard inputs are incorporated using virtual keyboard software on the host computer. Optionally, the input device 45 communicates with the computer via the wireless transceiver or the wired connection 40. An embodiment of the invention including a wireless receiver does not require an input device 45.

Figure 6:
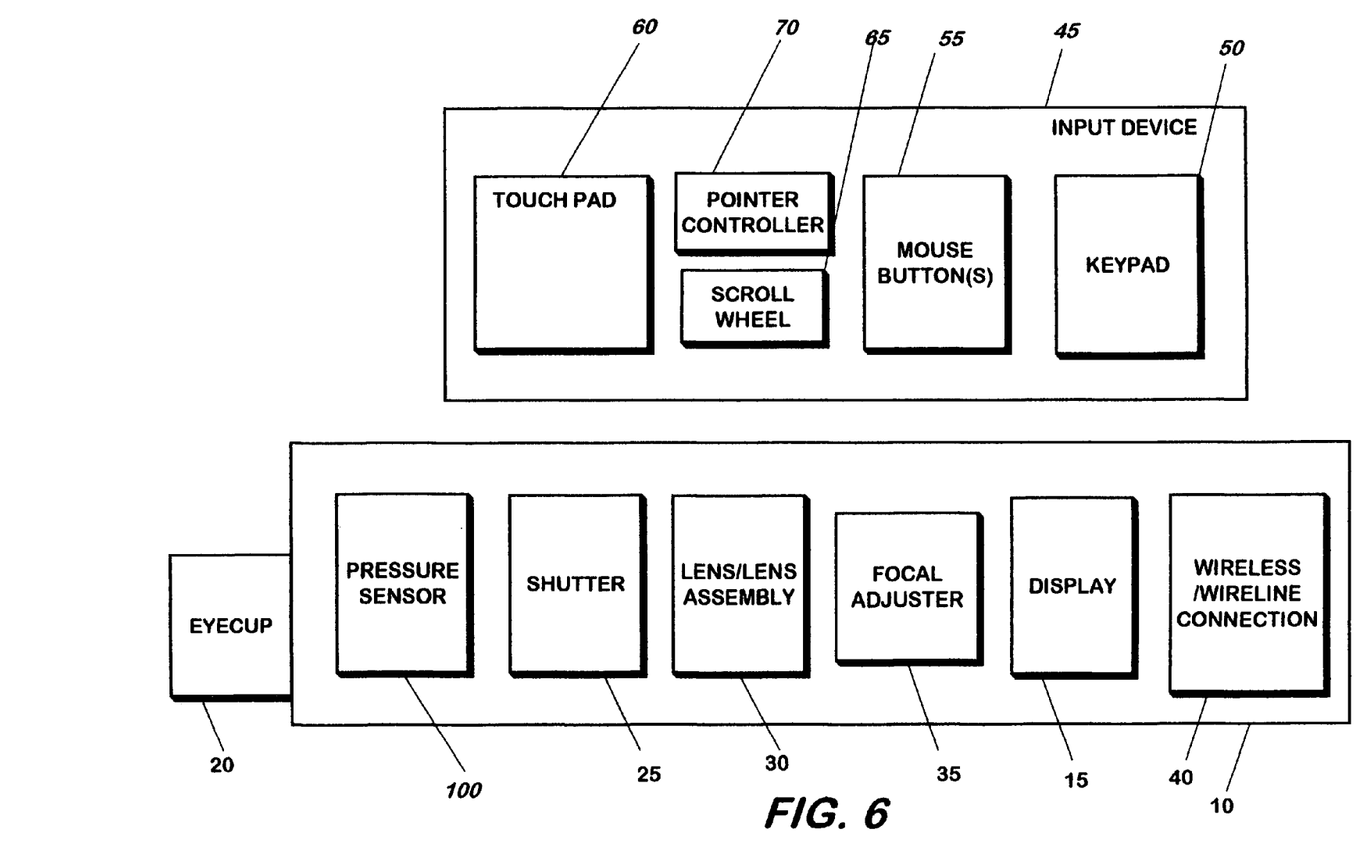
FIG. 6 is a block diagram of an alternate embodiment of the invention.

The invention, as shown in FIG. 6, optionally includes a pressure sensor 100 communicating with the eyecup 20 and electrically connected to the shutter 25 such that pressure against the eyecup 20 causes the pressure sensor 100 to electrically actuate the shutter 25 to open. Restoration of the eyecup 20 causes the shutter 25 to close. For example, the pressure sensor 100 electrically actuates the shutter 25 to close. Alternatively, the shutter 25 includes a normally closed switch, wherein the switch-off position corresponds to a closed shutter 25. In such an embodiment, the shutter 25 remains open as long as the pressure sensor 100 is signaling to the shutter 25, i.e., as long as the pressure sensor 100 determines that pressure is being applied to the eyecup 20.

Figure 7:
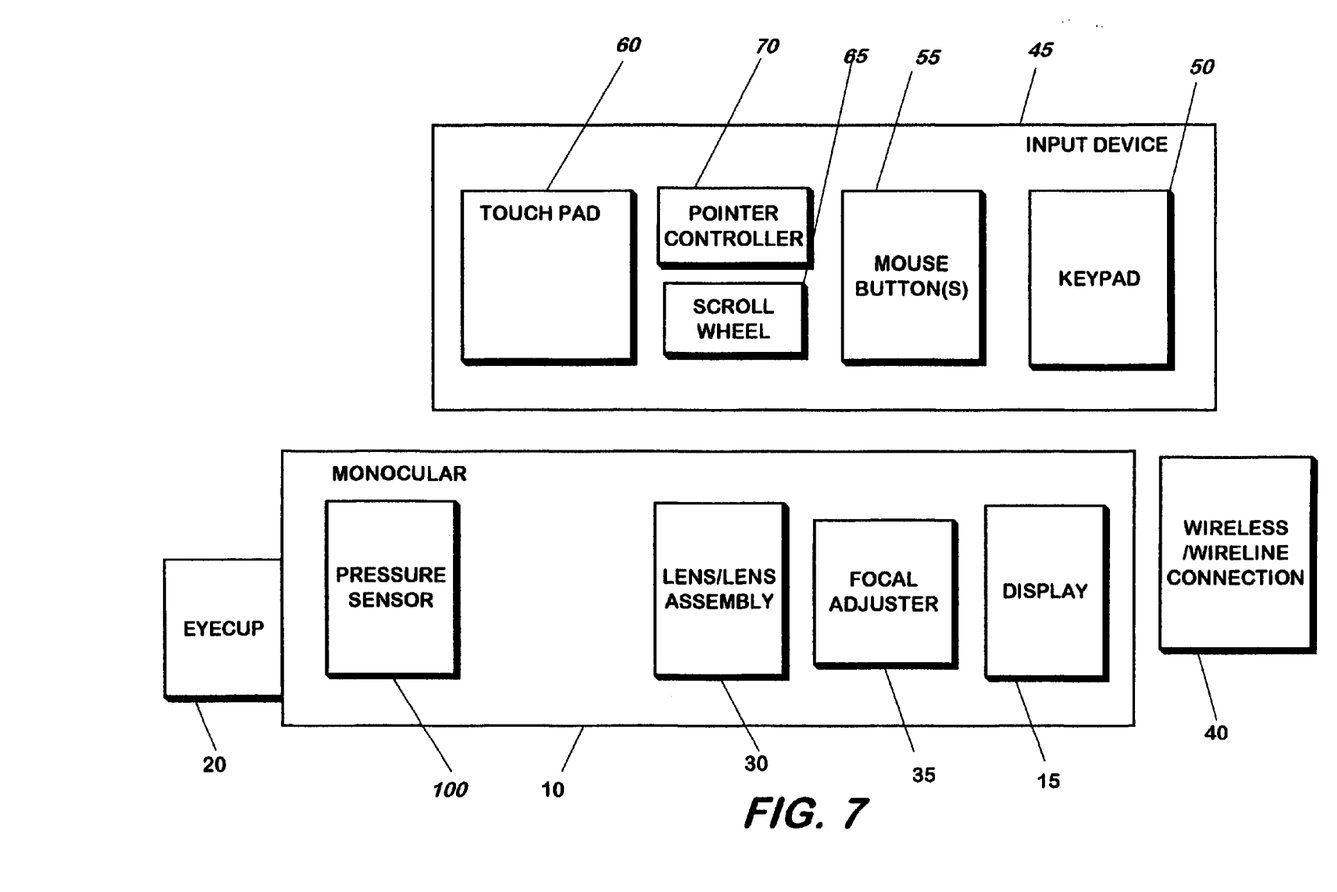
FIG. 7 is a block diagram of an alternate embodiment of the invention.

Alternatively, as shown in FIG. 7, the pressure sensor 100 communicates with the eyecup 20 and is electrically connected to the display 15 such that pressure against the eyecup 20 causes the pressure sensor 100 to electrically actuate the display 15. In such an embodiment, restoration of the eyecup 20 causes the display 15 to turn off. For example, the pressure sensor 100 electrically actuates the display 15 to turn off. Alternatively, the display 15 includes a normally closed switch, wherein the switch-off position corresponds to a turned-off display 15. In such an embodiment of the invention, the shutter 25 is optional.

Figure 4A:
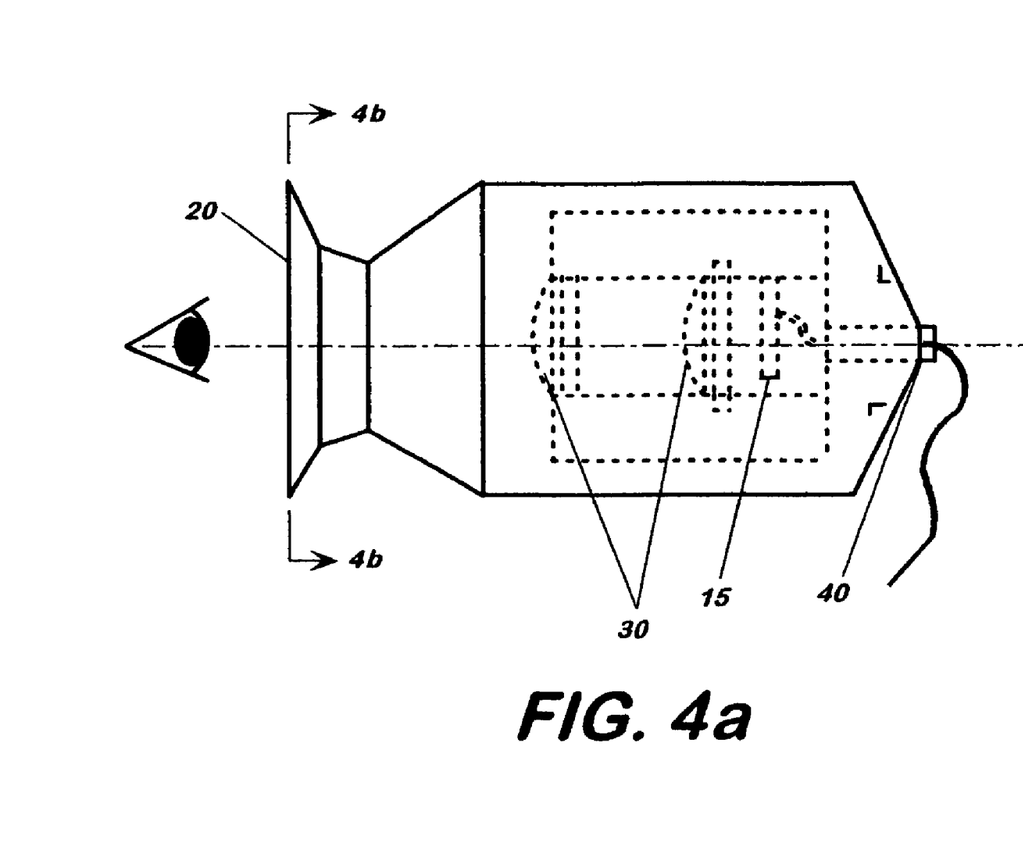
FIG. 4a is a cross-sectional view of an embodiment of the invention, wherein the eyecup is in the restored position.
Figure 4B:
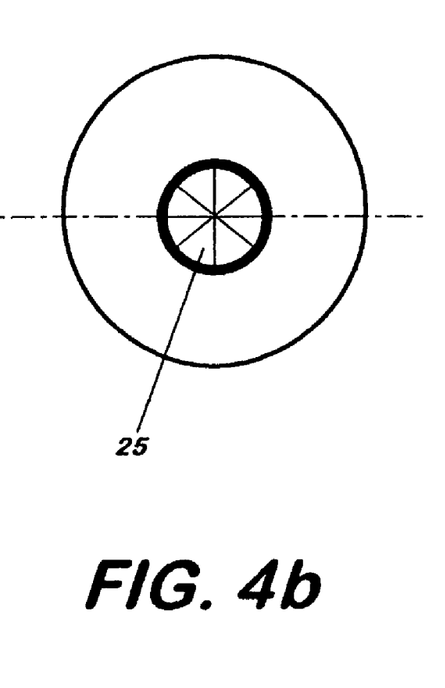
FIG. 4b is a cross-sectional view taken through line 4b-4b of FIG. 4a wherein the eyecup is in the restored position.
Figure 5A:
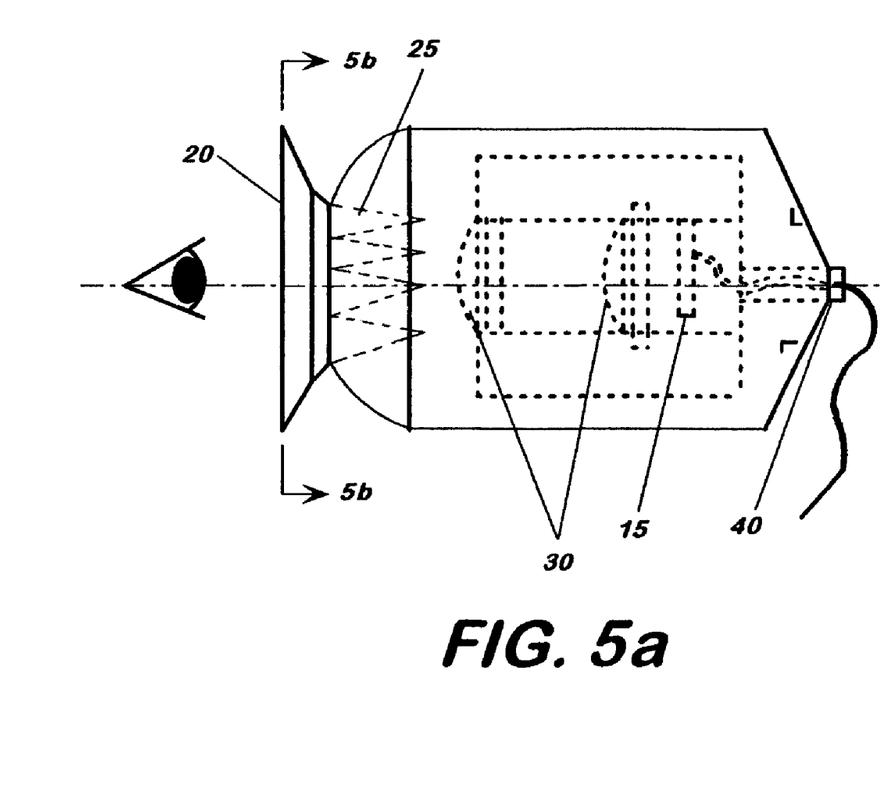
FIG. 5a is a cross-sectional view of an embodiment of the invention, wherein the eyecup is in the deformed position.
Figure 5B:
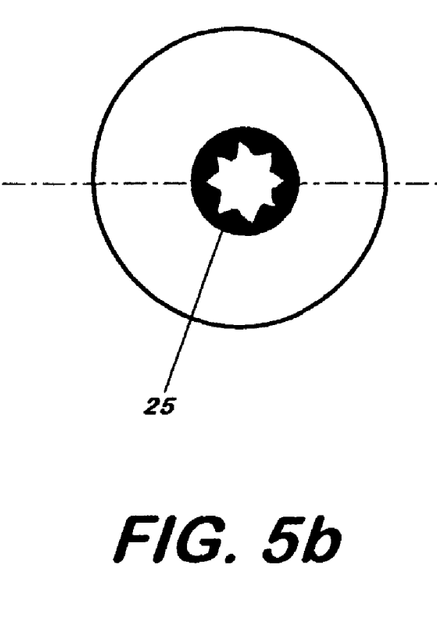
FIG. 5b is a cross-sectional view taken through line 5b-5b of FIG. 5a through the eyepiece of an embodiment of the invention, wherein the eyecup is in the deformed position.

An example of operation of the invention is described, referring back to FIGS. 2, 4*a*, 4*b*, 5*a*, and 5*b*. FIGS. 2, 4*a*, and 4*b* show an example of a restored position of the eyecup 20, such as when the apparatus is not in use. In the restored position, the closed shutter 25 prevents the display 15 from being seen through the eyecup 20. A user pushes his eye socket against the eyecup 20. The resulting pressure against the eyecup 20 deforms the eyecup 20. The deformation of the eyecup 20 opens the shutter 25, thereby permitting the user to view the display 15 through the eyecup 20 and the shutter 25. FIGS. 2, 5*a*, and 5*b* show an example of a deformed or depressed position of the eyecup 20, such as when the apparatus is in use. In the deformed position, the open shutter 25 permits the display 15 to be seen through the eyecup 20. The eyecup 20 minimizes or eliminates light leakage when the display 15 is not actively being utilized without, for example, revealing a user's tactical position at night. During the day, for example, the eyecup 20 substantially seals the line of sight, minimizing or preventing ambient light from affecting the readability of display 15. In such an embodiment, the display 15 may be kept powered on, even when the user is not using the monocular 10. Consequently, the instant invention minimizes or eliminates light emission from the display 15, as well as inhibits or prevents ambient light from affecting visibility of the display 15.

Obviously, many modifications and variations of the present invention are possible in light of the above teachings without departing from the true scope and spirit of the invention. It is therefore to be understood that the scope of the invention should be determined by referring to the following appended claims.

What is claimed is:

1. An apparatus comprising:
   a deformable eyecup;
   a micro-display sharing an optical path with said eyecup and communicating with said eyecup such that deformation of said eyecup turns said micro-display on and restoration of said eyecup turns said micro-display off;
   a monocular housing said micro-display, and
   a pressure sensor communicating with eyecup and said micro-display such that the deformation of said eyecup turns said micro-display on and the restoration of said eyecup turns said micro-display off.

2. The apparatus according to claim 1, wherein said eyecup comprises at least one of rubber, neoprene, plastic, and a pleated material.

3. The apparatus according to claim 1, wherein said micro-display comprises at least one of an organic light emitting display, a liquid crystal on silicon display, a transmissive display, a transreflective display, a reflective display, a plasma display, a digital light processing display, and a scanned-beam display.

4. The apparatus according to claim 1, further comprising:
   a lens sharing said optical path with said eyecup and said micro-display.

5. The apparatus according to claim 4, wherein said monocular houses said lens.

6. The apparatus according to claim 4, further comprising:
   one of a focus slide and a focus ring for adjusting a distance between said lens and said micro-display.

7. The apparatus according to claim 1, further comprising:
   a wireless receiver for receiving display data and sending the display data to said micro-display.

8. The apparatus according to claim 1, further comprising:
   one of a wired connection and a wireless transceiver for receiving display data and sending the display data to said micro-display; and
   at least one of a pointer controller, a scroll wheel, a touch pad, a mouse button, and a keypad for controlling the display data.

* * * * *